Patented Jan. 12, 1937

2,067,706

UNITED STATES PATENT OFFICE 2,067,706

ARTIFICIAL COMPOSITIONS

Hans Fikentscher, Ludwigshafen-on-the-Rhine, Germany, assignor to I. G. Farbenindustrie Aktiengesellschaft, Frankfort-on-the-Main, Germany No Drawing. Application December 6, 1933, Serial No. 701,156. In Germany December 10, 1932

21 Claims. (Cl. 260—2)

The present invention relates to new industrially valuable artificial compositions and a process of producing same.

I have found that industrially valuable artificial compositions are obtained by subjecting the saponification products of products obtainable by interpolymerizing acrylic acid esters and such vinyl esters as yield saponifiable polymerization products, to conditions under which lactone-formation occurs. Such conditions consist for example in treating the said saponification products with strong acids, for example with sulphuric, hydrochloric, nitric, phosphoric, perchloric or trichloracetic acid. With acids of between 10 and 20 per cent strength the reaction usually proceeds already at ordinary temperature. Elevated temperatures may, however, be used, especially if lower concentrations of acids be employed. Higher concentrations of acids may also be used. Acids such as sulphuric and nitric acid which in higher concentration and at elevated temperatures exert an oxidizing action on organic substances are employed under such conditions that the said undesired effect does not occur. Conditions under which lactone-formation occurs may be created also by subjecting the ammonium salts of the saponification products defined above to a heat-treatment. The said heat-treatment is carried out in the absence of solvents, for example at temperatures between about 100° and 150° C.

As suitable vinyl esters may be mentioned for example vinyl acetate, vinyl chloracetate, vinyl propionate, vinyl butyrate and vinyl stearate. Suitable acrylic acid esters are for example the alkyl esters such as the methyl, ethyl and butyl esters of acrylic acid, the cycloalkyl esters such as the cyclohexyl ester of acrylic acid and the aralkyl esters such as the benzyl ester of acrylic acid.

The said vinyl esters and acrylic acid esters are preferably used in equimolecular proportions but one or the other of the esters may be present in excess. By employing polymerization products containing varying proportions of the two components according to the present invention final products are obtained which possess varying properties, for example as regards solubility in water. By starting with polymerization products containing about equimolecular proportions of vinyl ester and acrylic acid ester usually final products are produced which are insoluble in water.

The saponification may be carried out in organic solvents such as ethyl alcohol or, advantageously, in aqueous dispersion, such as is obtained for example by emulsion polymerization, and is effected by consecutively treating the said interpolymerization products with aqueous acids and alkalies or by treating them with alkalies alone, the temperature being selected between room temperature and boiling temperature depending on the concentration of the alkali.

Since acid is split off from the vinyl ester and an alcohol is split off from the acrylic acid ester during the saponification of the mixed polymerization products, it is preferable to employ for the preparation of the mixed polymerization products the simplest and most readily available esters of vinyl alcohol and acrylic acid, namely vinyl acetate and acrylic acid methyl ester.

The artificial compositions obtained are hard, elastic and thermoplastic products which are insoluble in water or only swell when they come into contact therewith. They are suitable for the preparation of films, threads, coatings and dressings and may be worked up in a similar manner to celluloid, for example they may be pressed at elevated temperatures, for example at between 120° and 150° C. In photographic films they may be employed as an intermediate layer between the nitrocellulose film and the layer of gelatine for the purpose of increasing the electrical conductivity and thus preventing static discharge. They may also be worked up together with other highly polymeric substances, as for example with tragacanth, British gum, polyvinyl alcohol or with starch to yield waterproof dressings or sizes, with cellulose derivatives such as cellulose xanthate or ammoniacal cupric oxide cellulose solution to yield films or threads, whereby in the latter case for example the alkaline solution of the saponification product may be added to an alkaline cellulose xanthate solution before its precipitation with acid.

The following examples will further illustrate how the invention is carried out in practice, but the invention is not restricted to these examples.

*Example 1*

100 parts of an aqueous 25 per cent dispersion of a mixed polymerization product which has been obtained by interpolymerizing in the boiling heat an aqueous emulsion of equal parts of vinyl acetate and acrylic acid methyl ester in the presence of emulsifying agents for example 1 part of α-hydroxy-octodecane-sulphonic acid and hydrogen peroxide (from 2 to 3 per cent, calculated on the esters used), are stirred at 60° C. with 100 parts of 20 per cent caustic soda solution. As soon as dissolution has taken place, the solution is introduced into the equal amount of 25 per cent aqueous sulphuric acid, a colorless fibrous coagulate being precipitated. After thorough washing and drying, a hard artificial composition only capable of swelling in water remains behind which may be pressed into elastic articles while heating to between 100° and 150° C. under pressure.

If the aqueous alkaline solution of the saponification product mentioned in the preceding paragraph be added to a 7 per cent cellulose xanthate solution (containing between 3 and 20 per cent of the saponification product calculated on cellulose) and the mixture be worked up by coagulation in acid baths into films or threads, products are obtained which are distinguished by a good resistance to creasing.

*Example 2*

100 parts of an aqueous 25 per cent dispersion prepared as described in Example 1 are heated in a closed vessel with 100 parts of aqueous 20 per cent ammonia for 12 hours at 110° C. while stirring. By inspissation of the highly viscous solution of the saponification product obtained a residue is formed which by prolonged heating at 140° C. yields a product which is insoluble in water.

Although it is not possible to prove the lactone-structure of the compounds formed as exactly as it is possible with monomeric compounds, yet it can be concluded from the behavior and from the manner of formation that they contain lactone groupings. By varying the proportions of vinyl acetate and acrylic acid methyl ester products of somewhat modified proportions are obtained.

What I claim is:—

1. The process of producing artificial compositions which comprises subjecting a saponification product of a product obtainable by interpolymerizing an acrylic acid ester and such a vinyl ester as yields saponifiable polymerization products, to conditions under which lactone-formation occurs.

2. The process of producing artificial compositions which comprises subjecting a saponification product of a product obtainable by interpolymerizing about equimolecular proportions of an acrylic acid ester and such a vinyl ester as yields saponifiable polymerization products, to conditions under which lactone-formation occurs.

3. The process of producing artificial compositions which comprises subjecting a saponification product of a product obtainable by interpolymerizing an acrylic acid alkyl ester and such a vinyl ester as yields saponifiable polymerization products, to conditions under which lactone-formation occurs.

4. The process of producing artificial compositions which comprises subjecting a saponification product of a product obtainable by interpolymerizing acrylic acid methyl ester and vinyl acetate, to conditions under which lactone-formation occurs.

5. The process of producing artificial compositions which comprises treating a saponification product of a product obtainable by interpolymerizing an acrylic acid ester and such a vinyl ester as yields saponifiable polymerization products with a strong acid.

6. The process of producing artificial compositions which comprises subjecting the ammonium salt of a saponification product of a product obtainable by interpolymerizing an acrylic acid ester and such a vinyl ester as yields saponifiable polymerization products to a heat-treatment.

7. The process of producing artificial compositions which comprises subjecting the ammonium salt of a saponification product of a product obtainable by interpolymerizing an acrylic acid ester and such a vinyl ester as yields saponifiable polymerization products to a heat-treatment at between about 100° and 150° C.

8. Artificial compositions practically insoluble in water, comprising a lactone of a saponification product of a product obtainable by interpolymerizing an acrylic acid ester and such a vinyl ester as yields saponifiable polymerization products.

9. Artificial compositions practically insoluble in water, comprising a lactone of a saponification product of a product obtainable by interpolymerizing about equimolecular proportions of an acrylic acid ester and such a vinyl ester as yields saponifiable polymerization products.

10. Artificial compositions practically insoluble in water, comprising a lactone of a saponification product of a product obtainable by interpolymerizing acrylic acid methyl ester and vinyl acetate.

11. Artificial compositions practically insoluble in water, comprising a lactone of a saponification product of a product obtainable by interpolymerizing about equimolecular proportions of acrylic acid methyl ester and vinyl acetate.

12. An artificial composition practically insoluble in water obtained by saponifying an interpolymerized acrylic acid ester and a vinyl ester which yields saponifiable polymerization products and then subjecting the resulting saponified product to lactone-forming conditions.

13. An artificial composition practically insoluble in water obtained by interpolymerizing equimolecular proportions of an acrylic acid ester and a vinyl ester which yields saponifiable polymerization products, saponifying the resulting polymerizate and subjecting the resulting saponified product to lactone-forming conditions.

14. The product of claim 13 wherein the acrylic acid ester is acrylic acid methyl ester and the vinyl ester is vinyl acetate.

15. The process of producing artificial compositions which comprises treating a saponification product of a product obtainable by interpolymerizing about equimolecular proportions of an acrylic acid ester and such a vinyl ester as yields saponifiable polymerization products with a strong acid.

16. The process of producing artificial compositions which comprises treating a saponification product of a product obtainable by interpolymerizing about equimolecular proportions of an acrylic acid alkyl ester and such a vinyl ester as yields saponifiable polymerization products with a strong acid.

17. The process of producing artificial compositions which comprises treating a saponification product of a product obtainable by interpolymerizing acrylic acid methyl ester and vinyl acetate with a strong acid.

18. Artificial compositions practically insoluble in water comprising a product obtained by treating a saponified interpolymerization product of an acrylic acid ester and such a vinyl ester as yields saponifiable polymerization products with a strong acid.

19. Artificial compositions practically insoluble in water comprising a product obtained by treating a saponified interpolymerization product of about equimolecular proportions of an acrylic acid ester and such a vinyl ester as yields saponifiable polymerization products with a strong acid.

20. Artificial compositions practically insoluble in water comprising a product obtained by treating a saponified interpolymerization product of acrylic acid methyl ester and vinyl acetate with a strong acid.

21. Artificial compositions practically insoluble in water comprising a product obtained by treating a saponified interpolymerization product of about equimolecular proportions of acrylic acid methyl ester and vinyl acetate with a strong acid.

HANS FIKENTSCHER.